UNITED STATES PATENT OFFICE.

BERNHARD PRIEBS AND OSKAR KALTWASSER, OF BERLIN, GERMANY, ASSIGNORS TO THE ACTIEN-GESELLSCHAFT FÜR ANILIN FABRIKATION, OF SAME PLACE.

BLACK DYE.

SPECIFICATION forming part of Letters Patent No. 628,607, dated July 11, 1899.

Application filed April 8, 1899. Serial No. 712,253. (Specimens.)

*To all whom it may concern:*

Be it known that we, BERNHARD PRIEBS and OSKAR KALTWASSER, of Berlin, in the Kingdom of Prussia, German Empire, have invented new and useful Improvements in the Production of Black Dye; and we do hereby declare that the following is a full, clear, and exact description thereof, which will enable others skilled in the art to which it appertains to make and use the same.

Our invention is based on the observation that oxynitrodiphenylamin-sulfonic acid

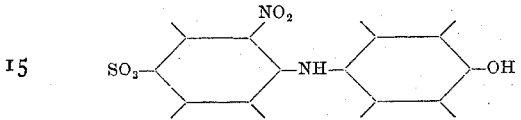

on heating with sulfur and alkalisulfid yields a coloring-matter which dyes unmordanted cotton deep black shades of remarkable intensity and fastness. This acid is prepared by heating in a closed vessel for about two hours at 140° an aqueous solution of ortho-nitrochlor-benzene-para-sulfonate of potassium with an equimolecular quantity of para-amidophenol under addition of an agent absorbing the hydrochloric acid formed during the reaction—as, for instance, carbonate of calcium. After cooling, the product of the reaction partly separates in crystalline form and may be completely precipitated by means of potassium chlorid. The potassium salt of the new acid crystallizes from the aqueous solution in the form of reddish-brown crystals, which dissolve in water with brown-yellow color and in concentrated sulfuric acid with bluish-violet color.

In order to carry out our invention, we may proceed as follows: Into a fused mixture of thirty parts, by weight, of sulfur, seventy-five parts, by weight, of crystallized sodium sulfid, and a small quantity of water, which is heated to about 110° to 120° centigrade, we introduce twenty-five parts, by weight, of the sodium salt of oxynitrodiphenylamin-sulfonic acid. The melt is then heated to 140° to 150° centigrade. As soon as the mixture begins to thicken the temperature is raised to about 180° to 200° centigrade until the mass has become almost entirely dry. After cooling the product obtained is pulverized and the powder can be directly used for dyeing. It dissolves readily in water containing a small portion of alkalisulfid with greenish-blue color. On addition of mineral acids to this solution a brown-black precipitate is formed. In fuming sulfuric acid of twenty-per-cent. anhydride the dye dissolves with grayish-green color, which on standing turns, by the by, into gray. If a current of air is conducted through the aqueous solution of the dye, a black precipitate begins to separate out after some time. On further introduction of air a bluish-gray colored solution is formed.

Our new dye produces on unmordanted cotton in an alkaline or salt bath fine black shades. It is easily soluble, dyes evenly, and the dye-baths remain clear and do not deposit insoluble matters during the dyeing process, properties which are due to the application of a sulfonic acid as starting product. The aqueous solutions of our dye are not liable to immediate further oxidation on contact with the air, and therefore the dyeing process may be effected without special precautions.

The quantities of sulfur and sodium sulfid in the above example may be varied within wide limits, and we do not confine ourselves to the figures given in the above example. Moreover, it is not necessary to introduce the sodium salt of oxynitrodiphenylamin-sulfonic acid into the fused mixture of sulfur and sulfids; but we may also mix all the materials in the cold and heat them together to the temperature aforementioned.

Having now described our invention and in what manner the same can be performed, what we claim as new is—

The black dye which results from heating the sodium salt of oxynitrodiphenylamin-sulfonic acid

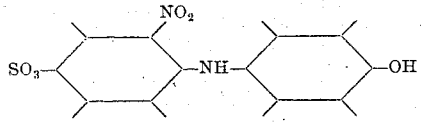

with sulfur and alkalisulfids; said dye being readily soluble in water containing a small portion of alkalisulfid with greenish-blue color; dissolving in fuming sulfuric acid with grayish-green color which turns into gray on longer standing; the aqueous solution yielding by the introduction of a current of air after some time a black precipitate, while on further introduction of air a bluish-gray solution is formed; said dye producing on unmordanted cotton in an alkaline bath black shades of remarkable intensity and fastness.

In witness whereof we have hereunto signed our names, this 22d day of March, 1899, in the presence of two subscribing witnesses.

BERNHARD PRIEBS.
OSKAR KALTWASSER.

Witnesses:
HENRY HASPER,
WOLDEMER HAUPT.